United States Patent
Bingeman et al.

(10) Patent No.: US 7,031,947 B1
(45) Date of Patent: Apr. 18, 2006

(54) METHOD AND APPARATUS FOR CONTINUING PLAY WITH CART-BASED NAVIGATION/INFORMATION SYSTEM DISPLAY

(75) Inventors: Kirk Bingeman, Phoenix, AZ (US); Douglas L. Lecker, Chandler, AZ (US)

(73) Assignee: ProLink Solutions, LLC, Chandler, AZ (US)

(*) Notice: Subject to any disclaimer, the term of this patent is extended or adjusted under 35 U.S.C. 154(b) by 674 days.

(21) Appl. No.: 09/626,648

(22) Filed: Jul. 27, 2000

(51) Int. Cl.
*G06F 17/60* (2006.01)
(52) U.S. Cl. .......................................... 705/77; 701/1
(58) Field of Classification Search ................ 705/52, 705/77, 79; 473/131, 150–152, 198–199; 701/1, 200, 213–215, 225, 300
See application file for complete search history.

(56) References Cited

U.S. PATENT DOCUMENTS

| | | | | |
|---|---|---|---|---|
| 5,319,548 A | * | 6/1994 | Germain | 700/92 |
| 5,507,485 A | * | 4/1996 | Fisher | 473/407 |
| 5,689,560 A | * | 11/1997 | Cooper et al. | 705/52 |
| 6,317,718 B1 | * | 11/2001 | Fano | 705/1 |
| 6,463,534 B1 | * | 10/2002 | Geiger et al. | 713/168 |

FOREIGN PATENT DOCUMENTS

JP  05046079 A  *  2/1993

OTHER PUBLICATIONS

"Southern Charm Welcomes Technology as the Sheraton San Marcos Resort Adds the ParView System", PR Newswire, p 9828, Oct. 4, 2000.*

* cited by examiner

*Primary Examiner*—Mary D. Cheung

(57) ABSTRACT

A method is disclosed for administering use of a golf course information system implemented in golf carts or other roving units with a monitor adapted to provide display of any or all of course and hole layout, course features and distance information to assist a golfer in play of the golf course, or of specific information of interest to the individual golfer from external networks including tournament and individual scoring, stock quotations and electronic mail to enhance the golfing experience. In the method, a gratis trial period less than an entire round of play of the course is invoked, during which the cart display of such information is activated for a golfer commencing use of the cart. The cart display of such information is automatically rendered inactive at the end of the gratis trial period unless, by that point of play, a payment authorization for completion of the round with activated cart display has been made.

11 Claims, 3 Drawing Sheets

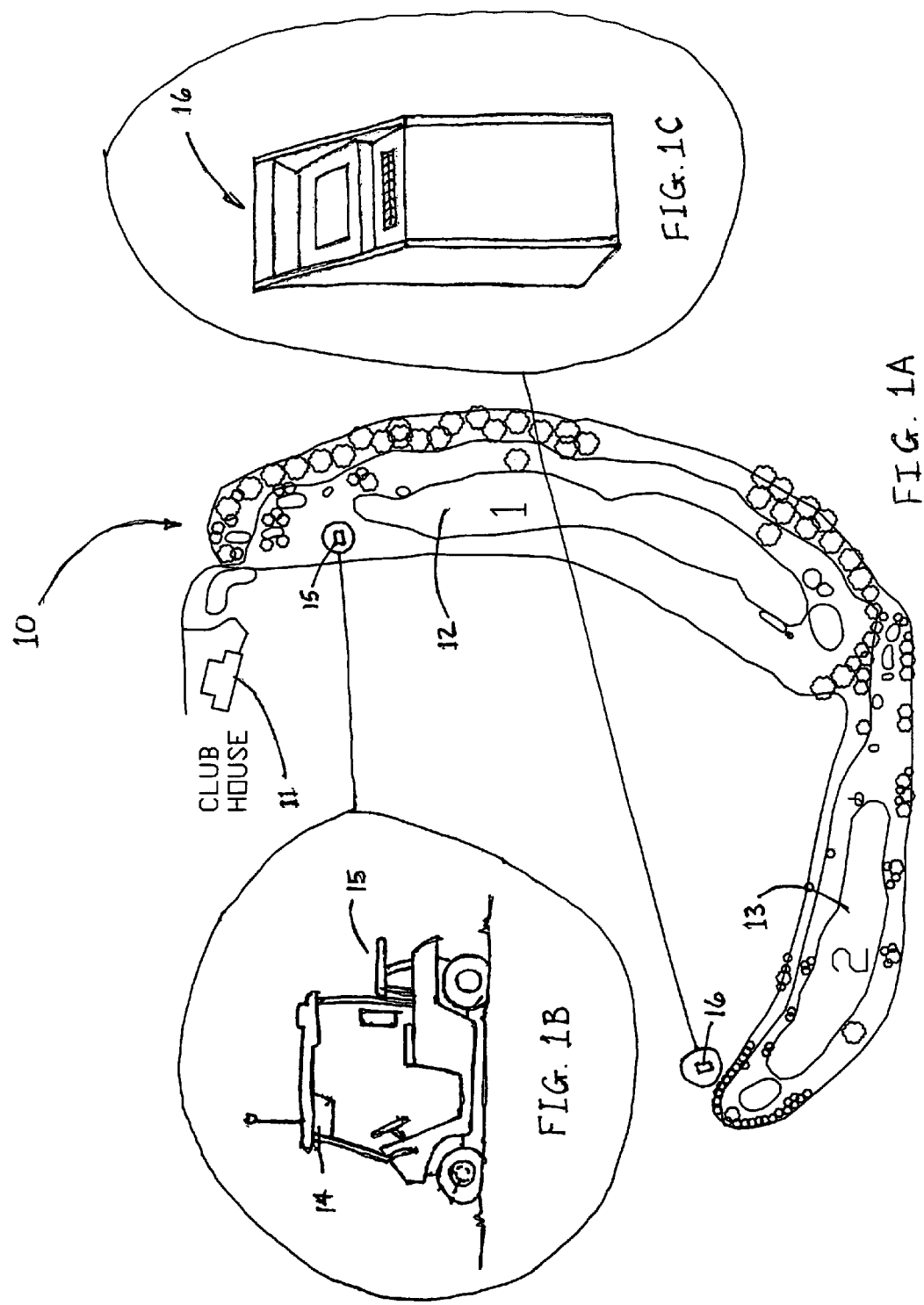

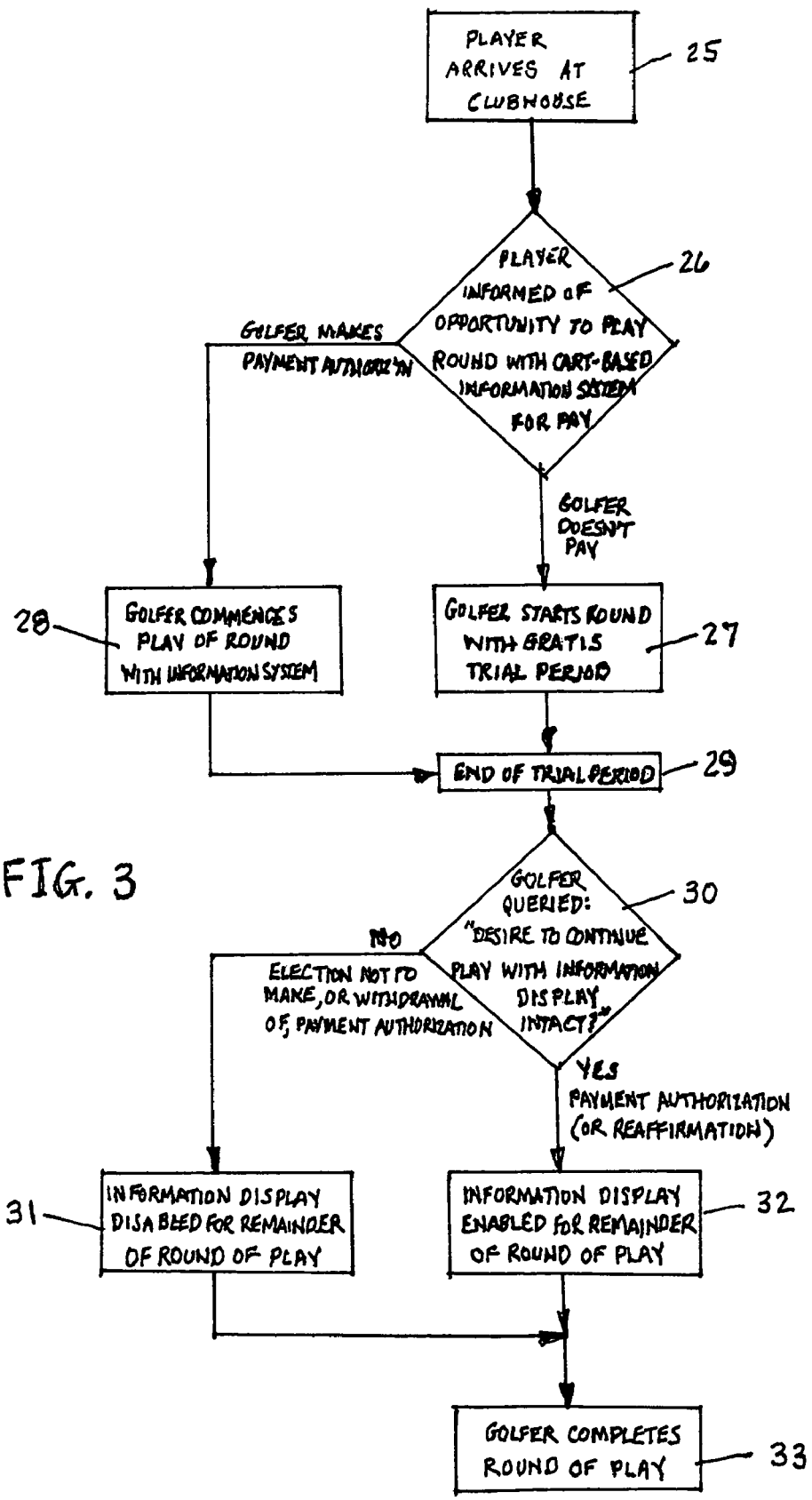

METHOD AND APPARATUS FOR CONTINUING PLAY WITH CART-BASED NAVIGATION/INFORMATION SYSTEM DISPLAY

BACKGROUND OF THE INVENTION

The present invention relates generally to position, distance measuring, navigation, information and communication systems for use in the playing of golf courses (referred to generally herein from time to time herein as a golf course information system), and more particularly to a method and system that allows a golfer to elect to use or not to use an available golf course information system in play of a course.

Amateur golfers generally excel on courses with which they are familiar. The golfer usually seeks to gain some familiarity with the layout of the holes to be played on a new or unfamiliar course before starting play. This enables the golfer to know at each tee shot, for example, whether the particular hole is a 'dog leg left', a 'dog leg right', or straight, as well as the location of hazards, such as sand traps, bunkers, and water traps, and the locations of range postings useful for calculating yardage from the ball's "lie" to the front and rear of the green, the pin (cup), a hazard, or a desired lay up position for an approach shot.

In recent years, the traditional booklet that sets out the course layout and feature information for the course being played, typically available at the course pro shop for just such use by the golfer, has been supplanted by automatic yardage measurement systems that use global positioning (GPS), dead reckoning, or other known navigation systems to provide the golfer with location and distance information for the golf cart relative to the cup and other features of the hole being played, on a display in the cart. Exemplary are PROLINK™ and ACUTRAK™ golf course information systems of ProLink, Inc. (PROLINK and ACUTRAK are trademarks of ProLink, Inc.), of Tempe, Ariz., the assignee of the present application. These systems provide, in addition to cart navigation information, and among other things, an efficient communications network for data transmission between a base station operated by the course administrator and carts on the course, high resolution color graphic displays on board the carts and at the base station to give the players selective views of each hole and portions thereof being played including location of salient features such as tee boxes, green, cup, fairway, rough, and hazards, and distances from current location of the cart. The systems detect the presence of the cart within a predetermined zone or region of the course to automatically activate display of the current hole on the cart monitor, as well as to measure pace of play for each hole, and provide automatic pop-up golf tips and advertisements on the cart monitor as the cart transitions from zone to zone or from one hole to the next.

Each roving unit—typically a golf cart but alternatively a hand-held or other unit of the system—uses the navigation technology embedded in the system and other enhancements to display a map of the overall or selected portion of the golf course, with an icon that represents the real-time position of the roving unit superimposed on the map of the hole being played, on the cart monitor. By moving a cursor on the screen to a feature of interest, the golfer can observe on the display the numerical distance from the current position of the cart to the designated feature, as well as the hole layout and hazards affecting play. This enables the golfer to make consistently better and faster club selection and other strategic and tactical decisions in play of the hole than would be the case without the availability of such a system.

These information systems may also provide a capability to collect and distribute scoring information; a feature which allows the golfer to obtain information regarding the scores of other golfers with or against whom the golfer is playing, while in actual play of the round. This knowledge can provide the golfer with the same experience during play as a tour professional, in that respect.

Such information systems may also provide a capability of connectivity to outside communications networks, such as the Internet, through their existing communications interface. Access to the information available from such networks is of significant interest to a number of golfers. Capability to receive electronic mail (e-mail), sporting event scores, or stock quotations, for example, are indicative of content that is or will be available to the golfer through these systems as they mature.

The course management portion of the PROLINK and ACUTRAK golf course information systems includes a base station computer unit, receiver/transmitter unit and display monitor in the clubhouse, typically in the pro shop. The base station setup gives the course administrator better insight into daily operations and revenues through identification and monitoring play of every cart on the course in real-time. The information and system capabilities available at the base station enables the administrator to pinpoint and analyze the cause of bottlenecks on the course; to compile an extensive computerized data base useful for statistical analysis of course operations and instituting improvements; to communicate with all carts on the course, and to enhance course revenues through advertising delivered to the cart monitors.

Typically, the cart-based golf course information system is offered to players at the time of sign-up at the course club house, as an option available at extra cost for the round being played. For golfers who may be totally unfamiliar, or not completely familiar, with the system, or who are being offered an entirely new or improved system, it would be desirable to have an opportunity to play a hole or two before requiring a decision on whether the advantages of the system are worth its cost to play the entire round with the cart-based system. Prior to the present invention, the player had to make an election before starting play so that the added cost of use of the golf information system could be imposed at the outset. If the player elected not to use the system, a cart would be assigned whose system graphics or display was made inactive.

It is a principal objective of the present invention to provide a method and apparatus which gives the player a reasonable but limited opportunity to evaluate a cart-based golf course information system during play of the course, and to make an election by a specified point in play of the round on whether or not to continue using the system to complete the round.

SUMMARY OF THE INVENTION

According to the present invention, a method and apparatus is provided for administering use of a golf course information system utilizing a roving unit, typically a golf cart, adapted for displaying information or data to the golfer(s) using the cart, using the information system and a monitor or other information access provider installed in the cart. Information displayed may include a view of the layout of the course, overall hole or portion thereof being played showing location of salient features such as tee boxes, green, cup, fairway, rough, and hazards and relative location of the cart on the hole, as well as providing a close approximation of the actual distance from the cart to the cup or other feature on the hole, tips on club selection, and other useful information to assist the golfer in playing the hole. The same may also provide other information to the golfer which is of interest in play of the game, such as scores of partners and/or opponents, and information which is of interest to the golfer outside the game being played, such as from other communications networks to which the system is connected, in the way of e-mail, sports scores, and stock quotations, to name a few.

The presently preferred method includes invoking a gratis trial period considerably less than an entire round of play of the golf course, for example the first two or three holes, during which the cart display is activated to allow the golfer or golfers using the cart to view such information relative to the current points of play, and automatically deactivating further display of such information, or the availability of such information, at the end of the gratis trial period unless, by that point, the golfer using the cart has made an appropriate commitment or authorization to pay for completion of the round with activated cart display.

The method includes providing a means to enable the golfer to make the payment commitment if he or she elects to continue play of the round with the display system. For example, the cart itself may be outfitted with suitable apparatus such as its existing radio communication system used in conjunction with the golf information system, or provided with a credit card or smart card reader, keypad, or wireless telephone. Or an appropriately located fixed or temporary structure with a card reader, keypad, telephone or other payment transaction apparatus may be used, such as a kiosk placed near the tee boxes of the next hole following the last hole designated for the gratis trial period. Alternatively, the payment transaction may be made via the golfer's personal wireless communicator such as a cell phone or hand-held computer, or using various other conventional payment transaction means.

The method may also be regarded as involving automatically rendering the cart display of such information inactive at the end of the gratis trial period unless, by that point of play, an act representing commitment of payment for completion of the round with activated cart display has been detected. The detection, for example, may be a signal at the base station that indicates a successfully completed credit card transaction by a golfer using the respective numbered cart. In either event, the cart display of such information is automatically maintained active for completion of the round if, by the end of the gratis trial period, a commitment of payment therefor has been made by a golfer using the cart.

The method of the invention may also be practiced by allowing the golfer to make a commitment of payment for cart display activation for an entire round of golf, prior to the start of the round, but subject to withdrawal of the authorization (e.g., by subsequent receipt of a credit) if the golfer elects not to continue use of the cart display beyond the end of the trial period. In that case, payment authorization is made before departing for the first tee, such as in the clubhouse or at the cart rental area. Here, in essence, the cart display of the available information is automatically maintained active for completion of the round upon a commitment of payment therefor by a golfer using the cart, since the golfer initially committed to pay for the entire round, but with the proviso that the commitment could be withdrawn by the end of the trial period. And if the commitment is not withdrawn, the status quo—display of the information on the cart monitor—is not affected.

The invention also provides apparatus for implementing the method, including means for invoking the gratis trial period by activating the display of a particular cart and means for automatically deactivating the display by the end of the gratis trial period, for example, using a device, control, logic circuit or computer program which is responsive to a successful payment transaction or the lack thereof up to the point at which the trial period ends (or to a withdrawal transaction) that selectively enables or disables the display in a particular numbered cart, at least insofar as the information available from the golf navigation system is concerned. Such control is preferably also made available to the golf pro in the pro shop, or to a cart rental supervisor in the cart shop, to rectify a fault or failure in the system or to override an automatic command if necessary. As noted earlier herein, a successful payment transaction may be signaled to the apparatus in the clubhouse or cart rental shop by means of a device that senses same, such as a sensor of a merchant authorization number from a credit card issuer.

Although for the great majority of courses, the roving unit will be a golf cart, the invention is not confined to carts, but may be used with hand-held wireless units having a monitor or display means for displaying cart navigation, course layout and related information, or with a unit carried in a manual wheeled-transporter for a golf bag, or any other suitable means. The method or means of displaying information may be liquid crystal display (LCD), cathode ray tube (CRT), electro-luminescent display, or any other conventional display means, and indeed, any means by which access to available information on the golf course information system is provided. The method or means of entering payment authorization may be by key pad, touch screen, card reader (e.g., for use with a credit or debit card, or for a smart card), currency reader, optical scanner, magnetic scanner, wireless communicator, or other conventional information input means suitable for the purpose. The method or means of communicating may be wire or wireless communication, radio transmission, radio/infrared/optical/magnetic transmission, or other communicating means suitable for the purpose, including data conversion means where required, and the capability to support secure data such as credit and debit data. The kiosk may be any type of apparatus, permanent or temporary, fixed or portable, and operable either manned or unmanned, that allows payment transactions (and certain limited credit transactions, if permitted by course management) for the purposes described herein. The payment method may be by entry of information as described immediately above. The base station is capable of supporting bi-directional communication with the golf cart(s) as well as the kiosk(s).

Rather than simply disabling the display of the information system display, the entire information and navigation system for the affected cart may be disabled. This is less desirable, however, because it would disrupt the course management aspects of the navigation system.

BRIEF DESCRIPTION OF THE DRAWINGS

The above and still further objects, features, aspects and attendant advantages of the present invention will become apparent from a consideration of the following detailed description of the best mode presently contemplated for practicing the invention, with reference to a preferred method, in conjunction with the accompanying drawings, in which:

FIG. 1A is a simplified plan view of a portion of a golf course, showing locations of the clubhouse and first few holes of the course, and FIGS. 1B and 1C are, respectively, are more detailed views of a golf cart and a kiosk at exemplary locations on the portion of the course of FIG. 1A at which the payment authorization and/or authorization withdrawal means may be located;

FIG. 3 is a flow diagram of a method according to the invention.

DETAILED DESCRIPTION OF THE BEST MODE IN PREFERRED EMBODIMENT(S) AND METHOD(S)

Figure 2A:
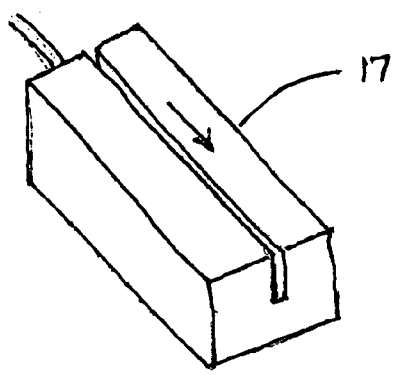
FIGS. 2A, 2B and 2C are simplified views of a card reader, a keypad, and a wireless phone, by which payment authorization or authorization withdrawal may be communicated.

The present invention provides several different approaches or embodiments for continuing play with a golf course information system subsequent to an initial gratis trial period. In each instance, the golfer commences a round of golf with the information system in operation for the golf cart being used. Unless a fully confirmed pre-payment is made for the entire round, without reserve (i.e., right to withdraw), the golfer is made aware, however, that the cart information display will continue for a limited period of time or, more typically, up to a specific point in the play of the course, through, say, the end of the second hole of the round (and the term "trial period" is intended here to have either such meaning of time or end location relative to the first tee). Following the trial period, the cart information display will be disabled so far as golf information aspects such as hole layout, distance measurement, and golf tips, or golf-related information such as player scoring, or extra-golf communications network services such as e-mail and personal financial information is concerned, unless a specific command indicative of payment authorization is entered to continue activation of the information display beyond that point. In that regard, it will be understood that disabling the display may be limited to certain aspects of the monitor's display capabilities, and not necessarily a complete shutdown of the display, since it is generally considered desirable by course management to take advantage of the display's capability to promote products and services of advertisers for purposes of revenue generation.

The pre-payment arrangement without reserve may include a cash payment for the operating system in the clubhouse or at the time the cart is rented, or an authorized charge of the system usage on the golfer's credit card, debit card, smart card, or against a personal identification number (PIN) or membership number, or the like (anything outside a cash transaction being referred to herein, for the sake of convenience, as a "payment authorization"). This situation would most often arise where the golfer had previously used the golf information system at the present course or another course, and had found it to possess advantages for play of the course which were worth the additional charge imposed for its use.

For many golfers, however, the system may be either one of first impression or with which the player has insufficient familiarity to enable making a considered decision as to whether it will prove useful in the golfer's play of the course. In any of those events, a final decision to use ordinarily will not be made until the trial period either has been completed or has progressed sufficiently for the golfer to weigh the merits of the system. Accordingly, the final decision may be deferred by making an initial decision at the clubhouse, the cart rental area or otherwise at the commencement of play, to proceed with the system usage for the duration of the trial period or until such earlier time that the final decision is reached as signified by entering an appropriate command.

For example, the initial decision by the golfer/user may be to furnish a payment authorization for use of the golf cart information system through the entire round, which can be countermanded at any time during the gratis trial period. The countermanding command may be entered via the communication system between the golf cart and the base station, or between a kiosk or fixed free-standing terminal located at the end of the hole where the trial period is deemed completed or some other point in the path of play of the course. Alternatively, the countermanding command may be relayed through any other pre-approved medium or means which can clearly convey the message that system usage is to be discontinued following the trial period. Once the trial period is completed without a countermanding command, however, the cost of the system is imposed regardless of whether the golfer actually continues to use the cart-based information system.

Preferably, however, the final decision is made not by means of a negative command as by countermanding of the initial decision, but rather, by entering a positive command which expressly authorizes continued usage of the system, as by a payment authorization entered at a keypad on the cart or at a kiosk along the cart route, or by swiping the appropriate card through the slot of a card reader on the cart or at a kiosk, or by any other means which positively conveys the message of desired continued use.

Validation of a such a positive command can be effected in any conventional manner commonly used in credit/debit confirmation of financial transactions. In general, such validation is provided in the case of a credit card by communication of a merchant authorization number or code from a central validation station of the credit card issuer after a substantially instantaneous check of the user's current available credit and payment standing, in response to an authorization request from a merchant involved in the credit transaction. Similar arrangements are used by other providers such as a bank or card issuer in the case of a debit transaction, or by a membership organization in the case of a member transaction. However, the payment authorization may be verified or validated in any other conventional manner, such as an end-of-day bulk validation transaction.

In its broadest form, the invention resides in a method for administering use of an information system implemented in golf carts adapted to provide access to information available through the information system to persons using the carts during play of a golf course, including establishing a trial period at the start of play with a cart, less than an entire round of play of the golf course, during which at least the bulk of the information is available for access by the cart user, and ending access to the available information by the cart user at the end of the trial period absent a payment authorization for continued access during play of the round.

Apparatus for administering use of an information system implemented in golf carts adapted to provide access to information available through the information system to persons using the carts during play of a golf course includes the cart-implemented information system that automatically establishes a trial period at the start of play of a round of golf with a cart on the golf course, less than an entire round, during which substantially all of the information is available for access by the cart user, and entry means for detecting payment authorization by the end of the trial period for enabling continued access to the available information beyond the end of the trial period.

Referring to FIG. 1A, a portion of a typical golf course 10 is shown in plan view—here, the clubhouse 11 and the first two holes 12 and 13 of the course. For the sake of example, and not of limitation of the invention, the first two holes 12 and 13 constitute the extent of the gratis trial period for availability of display of selected information on a monitor 14 (FIG. 1B) installed on a golf cart 15. The cart 15 is outfitted with apparatus (including monitor 14) which at least in part uses the golf course information system implemented in the golf carts and base station of the golf course 10. The cart-based system may use all facets of an overall cart navigation, monitoring, communication, advertising and information system employed at golf course 10, which constitutes prior art and need not be described in detail for purposes of an understanding of the present invention. Alternatively, the information system employed in the cart may be very limited in scope, such as to known golf scoring systems or to wireless access to external communications networks such as the Internet for web-based transactions (e.g., e-mail, stock quotations, sporting event updates, etc.). Any or all portions of these various systems are referred to herein generically as a golf information or golf course information system, irrespective of whether or not information pertaining specifically to the game of golf is available or presented. Some golfers may be interested in only limited fare, but that interest may nevertheless be considerable.

In addition to the somewhat more detailed view of the golf cart 15 in FIG. 1B, a more detailed view of a kiosk 16, located in this example at the end of the second hole 13 of course 10, is shown in FIG. 1C. Of course, typically the kiosk would be sheltered from or otherwise impervious to the elements in some manner (not shown).

Figure 2B:
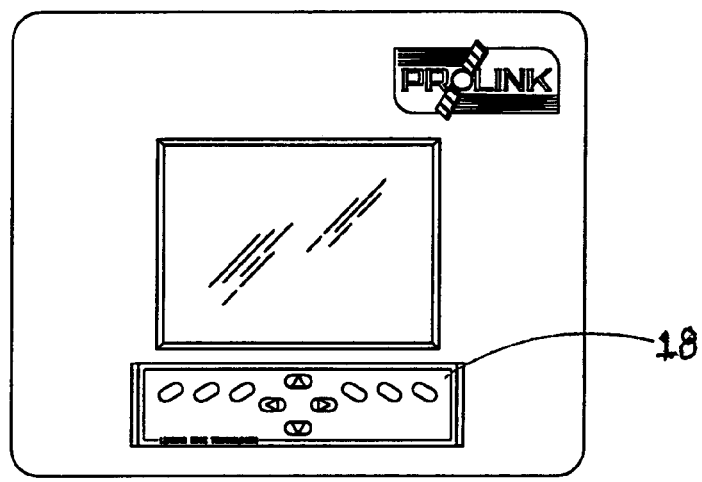
Figure 2C:
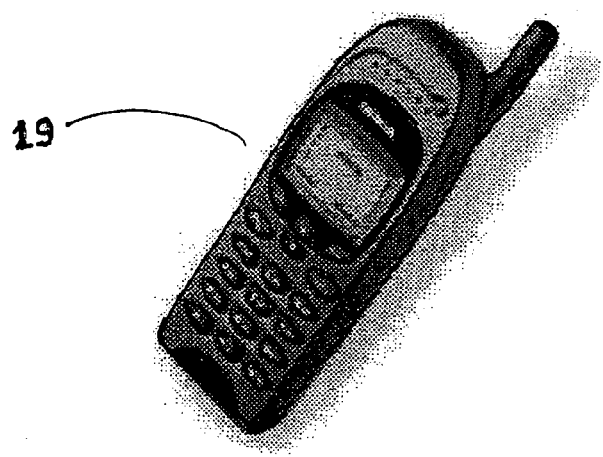

As shown in FIGS. 2A, 2B and 2C, respectively, the payment authorization or commitment means may consist of a card reader 17, a keypad 18, or a wireless telephone 19, for example, any one or more of which may be mounted in golf cart 15 or in kiosk 16. The latter constitutes a fixed entry terminal (which may be a permanent or portable structure) located in the path of play of a round, such as at the end of the second hole 13 or near the tee boxes at the beginning of third hole (not shown) of the golf course, in contrast to (or in addition to) an entry terminal in the cart itself. In practice, the capability of payment authorization (or commitment means) using a kiosk-type fixed entry terminal is made available to the golfer at a designated location at or near the end point of the portion of the course 10 designated for the gratis trial period.

If the player elects to authorize payment for the system usage for the entire round to be played, this would typically be accomplished in the clubhouse 11 or at the cart rental area or any other convenient place prior to departing for the first tee. In that event, the player may be given an option to withdraw the payment authorization at any time before the end of the gratis trial period, on the possibility that the player and/or his or her companion in a twosome occupying the cart may choose not to continue using the system for whatever reason. The payment authorization withdrawal means may be the same as or similar to the card reader 17, keypad 18, or wireless telephone 19 used for making a payment authorization in the example set forth immediately above.

The method of the invention is outlined by the flow diagram of FIG. 3. The player upon arrival at the clubhouse (at 25) is informed of the opportunity (at 26) to utilize the golf information system through the information display on the monitor 14 mounted in each golf cart 15 during play of the round. For golfers who are unfamiliar with the system, the gratis trial period offers a brief but reasonable part of a round of play in which to become aware of the advantages of the system, and this is the choice for the golfer who elects not to pay. This golfer starts the round of golf with the information display intact for the gratis trial period, as at 27. If the golfer is familiar with use and advantages of the system, or even if not, he or she may choose to authorize payment before commencing the round, and in that case, commences play of the round with the cart-based information system display intact, as at 28.

At some point by the end of the gratis trial period, as at 29, say, at the end of the second hole 13, the player is queried as to whether he or she desires to continue play, for the remainder of the round, with the information display intact, as at 30. If the golfer elects not make a payment authorization, or, if having made such an authorization at the outset of the round, elects to withdraw that payment authorization, the information display is disabled for the remainder of the round of golf, as at 31. On the other hand, if the golfer elects to continue to take advantage of the information system display, he or she does so by answering in the affirmative and by entering a payment authorization (or reaffirmation of the previous authorization) using a device (e.g., card reader 17, keypad 18, or wireless telephone 19) provided in the cart 15 or at the kiosk 16. In that case, the information display is enabled for the remainder of the round of golf, as at 32.

The authorization may be validated immediately by the organization that issued the credit card, debit card, or smart card used by the golfer or of which he or she is a member, as is typical of any point-of-sale transaction involving the card holder or membership holder and the merchant-seller, or may be validated in an end-of-day bulk validation through the course administrator's office with the issuer or membership organization (including, for example, membership in the golf course itself, where the transaction is charged to the member's monthly "tab").

Disabling or deactivating the information display for the remainder of the round of play does not necessarily mean that the overall information system is disabled for the cart in question. In fact, that would be undesirable because it would disable the course administrator's capability to monitor the location of the disabled cart on the course at the base station. Nor does disabling or deactivating the information display necessarily mean that only the display on the cart monitor is shut down, because that would disable the capability to have advertising or informational messages of general interest to golfers on the course or directed to this particular individual golfer, displayed on the screen of the cart monitor. Rather, disabling or deactivating the information display in the context of the present invention means only that the capability of the golfer to obtain the bulk of information useful for play of the round from the golf information system implemented on the course, through display on the cart monitor, such as a map of the course or specific hole being played, location of the cart on the map, distances from cart to the flag or cup or to hazards on the hole, golf tips including club selection for a particular lie on the hole, or scoring of other golfers playing the round with him or her, or to obtain substantial information of other interest to the golfer from extra-course communications networks through display on the cart monitor, such as stock quotations, e-mail, or other items available on the worldwide web, is terminated. It is not essential to the principles of the invention that a display be utilized to provide the information, or to provide access to the information available on the golf course information system. For example, the information may be provided through an audio system, although the use of a monitor capable of displaying the information is preferred.

Many different scenarios of usage of the information display system in play of the course are possible, within the principles and scope of the present invention. Some possibilities are as follows. In one example, a player who wishes to continue using the information display enters payment authorization prior to the end of the gratis trial period, along with the number or other identifier of the cart, which is communicated to the base station. Payment is then validated, and if valid, the base station maintains the display operational for that cart. In the unlikely event of rejection of the payment transaction, a confirming message is communicated from the base station to the cart, and the information display is deactivated for that cart. Or the deactivation may be accomplished by automatic operation at the cart itself if a validation message is not received by the cart within a predetermined period of time.

In another exemplary scenario, the player enters payment authorization at a kiosk or from the cart and, in response, receives an activation code by way of a message to the cart or on a printout from the payment entry means. This code is then entered on a keypad in the golf cart to maintain the information display operational in the cart. Yet another possible scenario is that the cart activation code is entered directly and automatically to the cart from the base station, or indirectly from the kiosk if that is the point of original entry of the transaction.

Upon completion of play of the round by the golfer (and his or her playing partners, if applicable), at 33, the golf cart is returned to the clubhouse or cart rental garage for availability to another arriving player.

Although a presently contemplated best mode of practicing the invention has been described by reference to certain preferred methods and embodiments, it will be apparent to those skilled in the art that variations and modifications may be made without departing from the spirit and scope of the invention. Accordingly, it is intended that the invention be limited only to the extent required by the appended claims and the principles of relevant law.

What is claimed is:

1. A method for administering use of a golf course information system implemented in golf carts or other roving units with display monitor adapted to provide display of any or all information from among course and hole layout, course features and distance to assist a golfer in play of the golf course, or of specific interest to the individual from external networks including tournament and individual scoring, stock quotations and electronic mail to enhance the golfing experience, said method comprising the steps of:
   invoking a gratis trial period less than an entire round of play of the course during which the cart display of such information is activated for a golfer commencing use of the cart; and
   automatically rendering said cart display of such information inactive at the end of said gratis trial period unless, by that point of play, a payment authorization for completion of the round with activated cart display has been made by a golfer using the cart.

2. The method of claim 1, including the step of providing the golfer with a capability to enter a payment authorization during or at the end of said gratis trial period.

3. The method of claim 2, wherein said step of providing a capability to enter payment authorization comprises outfitting the cart with said capability.

4. The method of claim 2, wherein said step of providing a capability to enter payment authorization comprises locating a kiosk outfitted with said capability at a point of play to be traversed by the cart during or at the end of said gratis trial period.

5. The method of claim 2, wherein said capability comprises at least one of a credit, debit or smart card reader, a paper currency reader, a keypad, a touch sensitive screen, an optical scanner, a magnetic scanner, and a wireless communicator.

6. A method for administering use of a golf course information system implemented in golf carts or other roving units with display monitor adapted to provide display of any or all information from among course and hole layout, course features and distance to assist a golfer in play of the golf course, or of specific interest to the individual from external networks including tournament and individual scoring, stock quotations and electronic mail to enhance the golfing experience, said method comprising the steps of:
   establishing a gratis trial period less than an entire round of play of the course during which the cart display of such information is enabled for a golfer using the cart; and
   disabling said cart display of such information at the end of said gratis trial period unless, by that point of play, an act representing commitment of payment for completion of the round with enabled cart display has been detected.

7. A method for administering use of a golf course information system implemented in golf carts or other roving units with display monitor adapted to provide display of any or all information from among course and hole layout, course features and distance to assist a golfer in play of the golf course, or of specific interest to the individual from external networks including tournament and individual scoring, stock quotations and electronic mail to enhance the golfing experience, said method comprising the steps of:
   invoking a gratis trial period less than an entire round of play of the course during which the cart display of such information is activated for a golfer commencing use of the cart; and
   automatically maintaining said cart display of such information active for completion of the round if, by the end of said gratis trial period, a commitment of payment therefor has been made by a golfer using the cart.

8. A method for administering use of an information system implemented in golf carts adapted to provide access to information available through said system to persons using the carts during play of a golf course, said method comprising the steps of:
   establishing a trial period at the start of play with a cart, less than an entire round of play of the golf course, during which at least the bulk of said information is available for access by the cart user, and
   ending access to said available information by the cart user at the end of said trial period absent a payment authorization for continued access during play of the round.

9. Apparatus for administering use of an information system implemented in golf carts adapted to provide access to information available through said system to persons using the carts during play of a golf course, comprising:
   said cart-implemented information system automatically establishing a trial period at the start of play of a round of golf with a cart on said golf course, less than an entire round, during which substantially all of said information is available for access by the cart user, and entry means for detecting payment authorization by the end of said trial period for enabling continued access to said available information beyond the end of said trial period.

10. A method of controlling the availability of information presented to a user of a golf course mobile navigation system from within the system during play of the course, wherein at least some of said information is presented relative to the real-time position of the system as it traverses the course, to enhance play, said method comprising the steps of:

providing a gratis trial period for full availability of said information to the user on commencing use of the system, less than an entire round of play of the course, and automatically curtailing the amount of said information available to the user at the end of said trial period, unless payment authorization is given for continued full availability thereafter.

11. Apparatus for controlling the availability of information presented to a user of a golf course mobile navigation system from within the system during play of the course, wherein at least some of said information is presented relative to the real-time position of the system as it traverses the course, to enhance play, said apparatus comprising:

means adapted to implement a trial period for full availability of said information to the user on commencing use of the system, less than an entire round of play of the course, and means responsive to completion of said trial period without a commitment to pay for continued full availability of said information in further play of the round, for automatically curtailing the amount of said information available to the user from the system thereafter.

* * * * *